United States Patent
De Godos Crespo et al.

(10) Patent No.: US 9,901,864 B2
(45) Date of Patent: Feb. 27, 2018

(54) DEVICE AND METHOD FOR SIMULTANEOUS HYDROGEN SULPHIDE REMOVAL AND BIOGAS UPGRADING

(71) Applicant: FCC AQUALIA, S.A., Madrid (ES)

(72) Inventors: Ignacio De Godos Crespo, Madrid (ES); Raúl Cano Herranz, Madrid (ES); José Ramón Santiago Costa, Madrid (ES); Enrique Lara Corona, Madrid (ES); Bernardo Llamas Moya, Madrid (ES)

(73) Assignee: FCC AQUALIA, S.A., Madrid (ES)

( * ) Notice: Subject to any disclaimer, the term of this patent is extended or adjusted under 35 U.S.C. 154(b) by 182 days.

(21) Appl. No.: 15/051,984

(22) Filed: Feb. 24, 2016

(65) Prior Publication Data

US 2016/0250584 A1    Sep. 1, 2016

(30) Foreign Application Priority Data

Feb. 27, 2015    (EP) .................................... 15382087

(51) Int. Cl.
*B01D 53/14*    (2006.01)
*B01D 53/18*    (2006.01)
(Continued)

(52) U.S. Cl.
CPC ............. *B01D 53/18* (2013.01); *B01D 53/04* (2013.01); *B01D 53/1425* (2013.01);
(Continued)

(58) Field of Classification Search
CPC ................ B01D 53/04; B01D 53/1425; B01D 53/1462; B01D 53/1468; B01D 53/18;
(Continued)

(56) References Cited

U.S. PATENT DOCUMENTS

| | | |
|---|---|---|
| 5,797,979 A | 8/1998 | Quinn |
| 8,500,864 B2 | 8/2013 | Günther |

(Continued)

FOREIGN PATENT DOCUMENTS

| | | |
|---|---|---|
| WO | 2008/072215 | 6/2008 |
| WO | 2008/116878 | 10/2008 |

(Continued)

OTHER PUBLICATIONS

European Search Report dated Aug. 5, 2015 in corresponding European patent application No. 15 38 2087.

(Continued)

*Primary Examiner* — Frank Lawrence
(74) *Attorney, Agent, or Firm* — Lucas & Mercanti, LLP

(57) ABSTRACT

A sustainable method and a system for cleaning impurities, mainly hydrogen sulphide, and upgrading of biogas having hydrogen sulphide concentration up to 2% (20,000 ppmv), preferably produced in wastewater treatment plants (WWTPs) to biomethane. The system includes a counter-current, non-pressurized physical absorption bubble column having a high influent liquid-to-gas flow ratio $L_I/G$ higher than 1 and preferably equal or higher than 3 and equal or lower than 10, for achieving a simultaneous removal of hydrogen sulphide and carbon dioxide. The system may be inserted for instance on an existing wastewater treatment plant, in such a way that the wash water is the primary treated wastewater of the plant, and preferably the biogas to be upgraded is produced in the anaerobic digesters of the plant itself, and also includes means for regenerating the used wash water by the biological reactor of the plant itself used for the secondary treatment.

17 Claims, 3 Drawing Sheets

(51) Int. Cl.
*B01D 53/78* (2006.01)
*B01D 53/04* (2006.01)
*C02F 11/04* (2006.01)
*C10L 3/10* (2006.01)

(52) U.S. Cl.
CPC ..... *B01D 53/1462* (2013.01); *B01D 53/1468* (2013.01); *B01D 53/78* (2013.01); *C02F 11/04* (2013.01); *C10L 3/101* (2013.01); *B01D 2252/103* (2013.01); *B01D 2253/102* (2013.01); *B01D 2253/106* (2013.01); *B01D 2253/116* (2013.01); *B01D 2256/245* (2013.01); *B01D 2257/304* (2013.01); *B01D 2257/504* (2013.01); *B01D 2258/05* (2013.01); *Y02E 50/343* (2013.01)

(58) Field of Classification Search
CPC .............. B01D 53/78; B01D 2252/103; B01D 2253/102; B01D 2253/116; B01D 2253/106; B01D 2256/245; B01D 2257/304; B01D 2257/504; C02F 11/104; C10L 3/101; Y02E 50/343
USPC .............. 95/226, 235, 236, 90; 96/243, 108; 423/220; 210/601
See application file for complete search history.

(56) References Cited

U.S. PATENT DOCUMENTS

| | | | |
|---|---|---|---|
| 8,747,522 | B2 | 6/2014 | Guenther |
| 2008/0134754 | A1 | 6/2008 | Funk |
| 2010/0107872 | A1 | 5/2010 | Bethell |
| 2013/0340616 | A1* | 12/2013 | Iyer ............ C10L 3/08 95/186 |
| 2014/0124439 | A1* | 5/2014 | Song ............ C02F 3/2853 210/603 |
| 2014/0134710 | A1* | 5/2014 | Grill ............ B01D 53/1425 435/266 |

FOREIGN PATENT DOCUMENTS

| | | |
|---|---|---|
| WO | 2009/116868 | 9/2009 |
| WO | 2009/116878 | 9/2009 |
| WO | 2011/136733 | 11/2011 |
| WO | 2012/128648 | 9/2012 |

OTHER PUBLICATIONS

Teodoria Al Seadi et al., "biogas Handbook", Mar. 10, 2010, XP055109027, retrieved from the Internet: URL:http://lemvigbiogas.com/BiogasHandbook.pdf.

* cited by examiner

DEVICE AND METHOD FOR SIMULTANEOUS HYDROGEN SULPHIDE REMOVAL AND BIOGAS UPGRADING

FIELD OF THE INVENTION

This invention relates to cleaning impuritites, mainly hydrogen sulphide, and upgrading the biogas, mainly removing carbon dioxide, coming from an industrial source, for example and preferably the biogas produced in wastewater treatment plants during anaerobic digestion of sewage sludge and biosolids, to be used as fuel.

BACKGROUND OF THE INVENTION

Anaerobic digesters help to stabilize sewage sludge and biosolids in wastewater treatment plants before it is either used in agricultural land or dried, incinerated or landfilled.

The product of anaerobic digestion, which is commonly called biogas, is a mixture primarily composed of methane and carbon dioxide, and usually undesired substances such as water, hydrogen sulphide, ammonia, oxygen, siloxanes and particulates.

Hydrogen Sulphide pre-cleaning of biogas is necessary to be used as fuel for combined heat and power (CHP) units or boilers and further cleaning and upgrading is required to be used as fuel for vehicles or gas grid injection.

Biogas upgrading refers to removal of carbon dioxide from biogas. The energy content of biogas is in direct proportion to the methane concentration, in such a way that the energy content of the gas is increased by removing carbon dioxide in the upgrading process, becoming comparable to natural gas.

There are four main techniques for upgrading biogas to vehicle fuel quality, among others: Absorption by water scrubbing (which is considered to be the closest prior art), PSA (Pressure Swing Adsorption), organic physical scrubbing and absorption with chemical reaction or membranes separation.

Biogas cleaning refers to the removal of the cited undesired substances from biogas, apart from carbon dioxide. The unwanted substances can be removed before, during or after the upgrading stage.

Pre-cleaning should be understood as removing the unwanted substance, mainly hydrogen sulphide, before the upgrading step in order to prevent corrosion and mechanical wear of the upgrading equipment itself. In addition, hydrogen sulphide can cause problems during the removal of carbon dioxide and it involves problems of bad odors.

There are many chemical, physical, and biological methods currently available for removal of hydrogen sulphide from biogas. Dry based chemical processes have been traditionally used for biogas applications, i.e. Iron Sponge and potassium-hydroxide-impregnated-activated-carbon systems are the most desirable ones. These processes are simple and effective, but also incur relatively high labor costs in order to handle and dispose of materials. Other significant drawbacks include a continually produced stream of solid waste and a growing environmental concern about appropriate disposal methods.

Addition of air by injection (2-6%) to the digester bed or headspace, or iron compounds introduced directly into the digester, have shown promising results as the partial removal method of $H_2S$. However, these methods show limited and inconsistent operating performances. Furthermore, oxygen is limited for biogas as vehicle fuel (<1% volume, according to the Swedish Standard) and it should be avoided. Liquid based and membrane processes require significantly higher capital, energy and media costs, and do not appear as economically competitive as selective $H_2S$ removal. Commercial biological processes for $H_2S$ removal that boast reduced operating, chemical, and energy costs are available, but they require higher capital costs of installation than dry based processes. Therefore, a low capital and operating cost for $H_2S$ removal from biogas is a need to address for biogas upgrading within current available technologies.

Upgrading process itself: In upgrading technologies where carbon dioxide is separated from biogas, some of the other unwanted compounds are also separated during the upgrading process itself.

Final polishing step: The biogas has to be dried and purified of hydrogen sulphide and siloxanes to obtain vehicle fuel quality, e.g. total sulphur <20 mg/Nm$^3$ and Water dew point of −10° C. at 200 bar, according to ISO 6327. Drying and purification can be obtained by cooling and adsorption using i.e. $SiO_2$, activated carbon or molecular sieves as in U.S. Pat. No. 8,747,522. These materials are usually regenerated by i.e. heating or a decrease in pressure. Other technologies for water removal are absorption in glycol solutions or the use of hygroscopic salts.

Cleaning and upgrading involves a notable cost in the biomethane production process. It is therefore important to have an optimized cleaning and upgrading process in terms of energy, water and chemical consumption and high purity methane as a final product.

Full Scale Technologies for Biogas Upgrading

When biogas is used as fuel for vehicles or gas grid injection it has to be upgraded, cleaned and compressed. A number of technologies have been developed to that end: absorption and desorption (PSA) methods.

1. Absorption

In an upgrading plant using the absorption technique the raw biogas meets a counter flow of liquid in a column which is filled with plastic packing (in order to increase the contact area between the gas and the liquid phase). The principal behind the absorption technique is that carbon dioxide is more soluble than methane, in such a way that the liquid leaving the column will thus contain an increased concentration of carbon dioxide, whereas the gas leaving the column will have an increased concentration of methane. Three examples of the absorption technology using different types of absorbents are water scrubbing, organic physical scrubbing and chemical scrubbing. Water scrubbing is the most common upgrading technique and plants are commercially available from several suppliers in a broad range of capacities.

1.1. Water Scrubbing

It is considered to be the prior art closest to the present patent.

1.1.1. Theoretical Background

To understand the present patent it is necessary to explain the basic principles of the process. Water scrubbing is used to remove carbon dioxide. It can also be used for hydrogen sulphide removal, but only if $H_2S$<500 mg/m$^3$ due to equipment corrosion and packing clogging problems. Removal of ammonia also occurs since these gases are more soluble in water than methane. The absorption process is purely physical.

The rate of gas mass transfer, i.e. from carbon dioxide to the liquid phase (water) is subject to the terms described in formula (1):

$$\frac{dC}{dt} = K_{La} \times \text{driving force} = K_{La} \times (C_{Sat} - C) \quad (1)$$

wherein

C=Dissolved gas (i.e. carbon dioxide) concentration in liquid (mass or mols/volume).

$C_{sat}$=Dissolved gas (i.e. carbon dioxide) at saturation in liquid (mass or mols/volume).

$K_{La}$=Overall mass transfer coefficient of gas (i.e. carbon dioxide) at temperature of absorption (1/time).

$(C_{sat}-C)$=driving force of the process. $C_{sat}$, saturation concentration of the gas, it is calculated using Henry's Law and varies with temperature (effect on $K_H$) and $P_{gas}$, the partial pressure of the gas, according to (2)

$$C_{sat} = K_H \times P_{gas} \quad (2)$$

Henry's constant at 25° C. ($K_H$) for hydrogen sulphide is $1.0 \times 10^{-1}$ M/atm, carbon dioxide is $3.4 \times 10^{-2}$ M/atm and for methane $1.3 \times 10^{-3}$ M/atm (Stumm & Morgan 1996), resulting in a solubility for hydrogen sulphide that is approximately 3 times higher than for carbon dioxide, and for carbon dioxide that is approximately 26 times higher than for methane. If the raw biogas consists of 50% methane and carbon dioxide respectively, the partial pressures of these gases will be equal in the bottom of the absorption column. Furthermore, if 100% of the carbon dioxide is dissolved in the water, at least 4% of the methane will also be dissolved in the water in an ideal system.

From formulae (1) and (2) it can be concluded that gas solubility in water scrubbing increases with the following strategies:

Strategy 1: Increasing $K_{La}$, gas-water contact efficiency. In practice by the number of plates (height of column) and optimizing type of packing.

Strategy 2: Increasing the driving force, $(C_{sat}-C)$, which can be done by:

Strategy 2.1. Increasing $C_{sat}$ when reducing the temperature (effect on $K_H$) and increasing $P_{gas}$.

Strategy 2.2. Decreasing C which is possible by using a large volume of water for absorption, that is to say, increasing the influent liquid-to-gas ratio ($L_I/G$).

Current water scrubbing systems use the lowest possible influent $L_I/G$ ratio in order to minimize water consumption, as in patent WO 2008/116878, with $L_I/G$ values of 0.1 to 0.3 m³ water at 20° C./Nm³ biogas per hour. The lowest $L_I/G$ is expressed as $L_{min}/G$, where $L_{min}$ is the equivalent water flow rate to dissolve the carbon dioxide until a saturation equilibrium is reached, and $C=C_{sat}$ resulting at the outlet of the absorption column. In those systems average C in the absorption column is high, and that is the reason why strategy 2.2 is not used. Instead, strategies 1 and/or 2.1 are used.

1.1.2. Description of the Process

The biogas is brought into contact with wash water at a high pressure; components of the biogas, mainly $CO_2$, are absorbed into the water until the saturation equilibrium is reached. Then, gas absorption ends since the $L_I/G$ equilibrium has been reached.

The raw biogas from the digester is just above atmospheric pressure and the water is saturated. Moisture and particles are removed at the inlet separator, then the gas is compressed up to 7-14 bars the biogas intake temperature can be from 15 to 38° C. (eg. 30° C.) and an outlet temperature after compression can be 70° C. for a discharge of 9 bars. Raw gas entered the absorption vessel at the bottom whereas water is fed at the top thereof and so the absorption process is operated in counter-current. The absorption vessel is provided with random packing in order to obtain maximum mass transfer. In this type of vessel, carbon dioxide is absorbed by the water and the biogas which leaves the vessel is enriched with methane. The gas leaving the absorption vessel has a methane concentration from 70 to 98% by volume, depending initial biogas composition and quality required. Before the upgraded gas is transported to the storage tank, it passes to a final polishing step, as described above to remove water to control the dew point below −80° C. and small amounts of hydrogen sulphide, as in WO 2009/116868.

Finally, the upgraded gas is odorized in order to be able to detect gas leakages, should they occur.

Since methane is partly water soluble, the water from the absorption vessel is conveyed to a flashing vessel in order to lower the methane losses. The water is de-pressurized in the flashing vessel down to 2 bars and the dissolved gas comes out. The dissolved gas, which contains some methane but mainly carbon dioxide, is released and transferred back to the raw gas inlet.

—Water Scrubbing with Regeneration

The water having the absorbed carbon dioxide and/or hydrogen sulphide which is contained in and leave the flashing vessel can be regenerated and recirculated back to the absorption column. The regeneration is carried out by air stripping in a desorption vessel, which is similar to the packed absorption columns to obtain a large mass transfer efficiency. The regenerated water is heated mainly by means of the energy input of the recycling pump; hence, it must be cooled before it is returned to the absorption vessels. High efficiency is obtained at less than 7° C. by the water chilling process. A lower process temperature results in reduced system pumping costs, hence the total energy consumption of a plant with water chilling is lower.

The stripping air contains $CO_2$ and $H_2S$ gases and needs to be treated by using an odor control process in order to avoid any nuisance before discharging air to the atmosphere. Besides, off-gases contain a methane concentration of 1-2%. It is important to minimize the loss of methane in order to achieve an economically viable upgrading plant. It is also important to minimize the methane slip since methane is a strong greenhouse gas. Methane can be present in the off-gas leaving a PSA-column or water scrubber with water recirculation or in water in a water scrubber without water recirculation. Thus, the release of methane to the atmosphere should be minimized by treating the off-gas or the water streams coming out of the plant even though methane cannot be used.

The off-gas from an upgrading plant is extremely difficult to treat because it seldom contains a high enough concentration of methane to maintain a flame without the addition of natural gas or biogas (energy consumption). One way of limiting the methane slip is to mix the off-gas with air that is used for combustion. Alternatively the methane can be oxidized by thermal or catalytic oxidation if the methane content is above 3%.

The treatment of the off-gas containing even less methane is increasingly difficult. Since not enough energy is provided during the combustion of this gas and raw biogas, biomethane has to be added in order to reach a stable oxidation, therefore reducing the overall energy balance and economy of the system. In the regeneration option, tap water is used. In spite of this, clogging of packings can occur. This is due to bacteria and other biological material entering the plant through the air that is added to the desorption column in order to drive out the carbon dioxide from the water. This means that the packings must be removed and washed by hand.

In addition, when biogas has a hydrogen sulphide content, the recycled water will soon be polluted soon with elementary sulphur which causes operating problems.

Therefore, the regeneration of water lowers the water usage but increases the energy and maintenance consumption.

Several patents have addressed this technology: US 2010/0107872 A1, WO 2009/116878 A1, US 2008/01344754 A1, and WO 2012/128648 A1.

—Water Scrubbing without Regeneration

In the other type of absorption, water is not regenerated in a desorption column. Instead of this, it is led way from the plant after the flash tank. This is more cost effective than regenerating the water if inexpensive water, such as treated sewage water, can be used. Since water is not regenerated there, no problem occurs with precipitation of elementary sulphur in the packing of the stripping vessel. Methane which is dissolved in water and not separated in the flash tank leaves the plant with the sewage water, thus the methane slip and the sulphide odors can be a problem in the final water discharge.

Clogging or biological growth on packings in the absorption column is an existing problem in upgrading plants without regeneration of water, when using treated sewage water as the water source. In those cases there are some biological materials that get stuck in the packings or cause growth.

1.2. Chemical Scrubbing

Chemical scrubbers use amine solutions. Carbon dioxide is not only absorbed in the liquid, but also reacts chemically with the amine in the liquid. Since the chemical reaction is strongly selective, the methane loss might be as low as <0.1%, and thus, no further off-gas treatment to reduce the methane emissions is necessary (U.S. Pat. No. 8,500,864 B2, 2013; and WO2011/136733 A1).

The application of this technology is advantageous if high methane recovery is desired. A drawback is the high heat demand of the regeneration step at 160° C. Besides, the projected plant capacity is medium to large. It is not feasible for small plants.

1.3. Organic Physical Scrubbing

Organic physical scrubbing is very similar to water scrubbing, with the important difference that the carbon dioxide is absorbed in an organic solvent such as polyethylene glycol. Carbon dioxide is more soluble in polyethylene glycol than in water. Therefore, there is less demand for recirculation of the solvent and the pumping costs are lower. However, the polyethylene glycol solution is regenerated by heating and/or depressurizing and thus energy costs are higher than in other technologies. Hydrogen sulphide, water, oxygen and nitrogen may be removed together with carbon dioxide. However, more often a previous step of $H_2S$ cleaning is required.

2. Pressure Swing Adsorption (PSA)

With this technique, carbon dioxide is separated from the biogas by adsorption on a surface under high pressure. The adsorbing material, usually activated carbon or zeolites, is regenerated by a sequential decrease in pressure before the column is reloaded again, hence the name of the technique. An upgrading plant, using this technique, has four, six or nine vessels working in parallel. When the adsorbing material in one vessel becomes saturated the raw gas flow is switched to another vessel in which the adsorbing material has been regenerated (pressure-swing method). During regeneration the pressure is decreased in several steps. The gas that is desorbed during the first and eventually the second pressure drop may be returned to the inlet of the raw gas, since it will contain some methane that was adsorbed together with carbon dioxide. The gas desorbed in the following pressure reduction step is either conveyed to the next column, or it is released to the atmosphere if it is almost entirely methane free.

If hydrogen sulphide is present in the raw gas, it will be irreversibly adsorbed by the adsorbing material. In addition, the water present in the raw gas can destroy the structure of the material. Therefore hydrogen sulphide and water need to be removed before the PSA-column.

Several patents have addressed this technology:
Adsorption with zeolites (WO09/5876 or WO2008/072215)
PSA with vacuum regeneration (U.S. Pat. No. 5,797,979).
The main drawbacks of this technology are:
Irreversible porous media saturation with a pollutant such as hydrogen sulphide, preventing the regeneration thereof.
Disposal of media at the end of the useful life
Methane can be present in the off-gas leaving a PSA-column. The methane slipped to the atmosphere is higher than those produced by the water scrubbing.
Complex design with 4 to 9 parallel vessels, multiple compressors, pipes and valves.
High operating cost, as it is an energy intensive method for adsorption and regeneration.

Problems to be Overcome by the Present Invention

Water scrubbing is the most common upgrading technique and plants are commercially available from several suppliers in a broad range of capacities. But they face a number of drawbacks:
Current available upgrading technologies are energy intensive with energy consumption of 0.3 to 0.6 kWh/$Nm^3$ raw biogas upgraded. It is mainly because they are high pressure compressors and the pumps and water is cooled to 5-7° C.
They require sulphide pre-cleaning to avoid corrosion and packing clogging problems; sulphide removal is a high cost process.
The oxygen concentration in biomethane has to be minimized. Stripping vessels draw these components into regenerated water, with further release in biomethane during absorption. Treated wastewater used in water scrubbing with no regeneration can also release oxygen.
Problems of hydrogen sulphide odors: Hydrogen sulphide can be present in the off-gas leaving the stripping column in a water scrubber with water regeneration or it can be also present in the wash water in a water scrubber without water recirculation.
Methane slip: it is also important to minimize the methane slip since methane is a strong greenhouse gas. Methane can be present from 1 to 2% (of total methane) in the off-gas leaving the stripping column in a water scrubber with water regeneration or in the wash water in a water scrubber without recirculation.
Water consumption: although it is small in modern plants, it still has a 0.05 $m^3$ water/$Nm^3$ in water scrubbing with regeneration and 0.1 to 0.3 $m^3$ treated wastewater/$Nm^3$ in water scrubbing with no regeneration. In the later case, pollution with $H_2S$ and methane is produced.

Consumibles demand: Antifouling agents are needed to avoid biological growth in the scrubber packing.

Clogging by bacterial growth and/or elemental sulphur precipitation due to packing in the scrubbing system.

They are complex systems with multiple high pressure compressors, high pressure pumps, valves, cooling, pressurized tanks, packing, etc., which make it feasible only for productions in the range of 60-70 $Nm^3/h$.

The upgrading of biogas in a small scale (<100 $Nm^3/h$) is commonly very expensive since a high amount must be invested.

OBJECT OF THE INVENTION

The object of the patent is a system and a method for cleaning and upgrading biogas, from any industrial source but preferably produced in wastewater treatment plants (WWTPs) for any use where only hydrogen sulphide removal is necessary (for example for feeding a combined heat and power (CHP) plant or boilers), and preferably to obtain biomethane as a vehicle fuel (that is to say, of vehicle fuel quality) or gas grid injection where a further cleaning and upgrading is required, thanks to a novel wash water device that also includes water regeneration means, thus overcoming the problems mentioned in currently available systems.

SUMMARY OF THE INVENTION

The invention relates to a system and a method for cleaning and upgrading (raw) biogas having hydrogen sulphide concentration up to 2% (20,000 ppmv), preferably biogas produced in wastewater treatment plants (WWTPs), to biomethane by means of physical water absorption.

The cleaning of impurities, mainly hydrogen sulphide, and upgrading system of biogas (preferably to biomethane) by removing the carbon dioxide, connectable to a facility for primary wastewater treatment of an existing WWTP, comprises:

a) a first influent pipe line or channel that provides wash water to the system by gravity and in the absence of pumping means, the wash water being primary treated wastewater coming from the wastewater primary treatment facility. One of the main advantages is that cheap large water flows can be used as high as 10,000 $m^3$/day without pumping energy consumption;

b) a second influent pipe line or channel that provides the raw biogas to the system;

c) a counter-current, non-pressurized physical absorption bubble column for achieving a simultaneous removal of hydrogen sulphide and carbon dioxide and having a high influent liquid-to-gas flow ratio ($L_f/G$ higher than 1, but preferably equal or higher than 3, more preferably from 3 to 10 and even more preferably from 4 to 6), for achieving a high efficiency physical absorption, the bubble column comprising four areas:

a first contact area at the top of the column, wherein the wash water enters downwards through the first influent pipe line by gravity at a rate V ranging from 0.01 m/s and 0.05 m/s, and the biogas is injected through the second influent pipe line in counter-current conditions by means of one or more fine bubble diffusers located at a height from 1.5 to 3 m below the first influent pipe line level and being connected to one or more low pressure blowers at a pressure sufficient for overcoming: the pressure drop of diffusers, the water level above diffusers and the small pressure of 20-50 mbars above the water level required for biomethane downstream processes, said pressure being preferably equal or lower than 1.7 bars, and more preferably ranging from 1.3 to 1.6 bars. Thus, the addition of high pressure compressors from 6 to 10 bar are prevented, unlike in the prior art;

a second small bubbles retention area, located below and adjacent to the first area, having a height from 1 to 2 m and more preferably ranging from 1 to 1.5 m, to prevent small bubbles from leaving with the outlet water, and with the same downwards rate as the first area;

a third (water) exit area, located all along the column from the bottom to the top and adjacent to the first and second area, wherein the wash water used goes upwards after the physical absorption at a rate of 0.3 to 1 m/s, and more preferably ranging from 0.4 to 0.5 m/s, having a vertical baffle to separate the used wash water flow from the first and the second areas, and a wash water outlet at the top thereof; and a fourth (solids) settling area at the bottom of the bubble column below the second area, wherein solids from the wash water, if any, are collected and drained periodically;

the bubble column also comprises an upgraded gas retention area at the top of the column, above the first area and the first influent pipe level, for collecting the upgraded biogas;

and d) means for regenerating the used wash water (regeneration means), connected to the wash water outlet of the (third) exit area of the column, said means being a biological reactor of the wastewater treatment facility itself used for a secondary treatment.

This system produces a physical absorption, unlike the known systems for upgrading biogas. The $L_f/G$ ratio is always higher than 1, unlike the prior art, and more preferably equal or higher than 3. For the object of the invention, it is advisable to delimit not only a minimum value for the $L_f/G$ ratio, but also a maximum value. The minimum $L_f/G$ ratio defines the value below which the $CO_2$ and the $H_2S$ do not dissolve properly and their content in the gas leaving the bubble column is higher than expected (carbon dioxide <5% and hydrogen sulphide >150 ppmv), whereas the maximum $L_f/G$ ratio of the range defines the value above which methane losses are too high (above 7%), then the final concentration of $CH_4$ decreases by this intrusion. In addition, operation at ratios L/G higher than 10 involves an excessive size of the bubble column with unsuitable dimensions, making the system inefficient. From this view, the $L_f/G$ ratio is preferably equal or lower than 10. Therefore it is preferably comprised between 3 and 10, being more preferably from 4 to 6. This high $L_f/G$ ratio of the present column implies absorption with a high water flow L. Such water flow L reduces the carbon dioxide concentration in water, C and therefore increases the mass transfer driving force in the water column ($C_{sat}$–C) and the efficiency of the process without high pressure, chemical absorption, packing scrubbers or cooling, unlike the prior art that commonly uses these types of elements/devices.

Thanks to the disclosed design, the bubble column allows simultaneous $CO_2$ and $H_2S$ removal from raw biogas without biogas pre-cleaning, in a sustainable way, since corrosion problems are minimized by removing high pressure compressors, water pumping, pressurized vessels or valves. To add more, it is possible to upgrade any biogas without limitation in its sulphide concentration, which may be even up to 20,000 ppmv (i.e. 2% v/v of $H_2S$ in the biogas to upgrade), unlike the prior art, in which said value is normally of 350 ppmv. In fact, it should be considered that the present invention covers as a preferred case a device and a method for cleaning and upgrading biogas having a sulphide concentration higher than 350 ppmv, which is not achieved for any system defined in the prior art.

Apart from this main advantage, thanks to the new system no water cooling device is required because the physical absorption is carried out at the wash water temperature, the temperature of primary treated wastewater being usually comprised between 5° C. and 30° C. and usually between 15° C. and 25° C. in Mediterranean countries (but that can vary from the primary treated wastewater temperature in other countries), and there is no heating energy input in the process, i.e. no high pressure compressors, pressurized water feeding or recycling pumping, unlike in the prior art.

Clogging problems are also minimized and even eliminated both due to elemental sulphur precipitation and bacterial growth, since no packing scrubber is used in the column. Antifouling agents are not necessary with this design.

Thanks to the fact that the system comprises a non-pressurized column it is possible to use fine bubble diffusers and low pressure blowers, in comparison with the high pressure compressors (6-10 bar) of the water scrubbing systems known in the field that are commonly used in this type of systems. As "low" pressure blowers should be understood the blowers known in the field that may inject the gas at a pressure preferably equal or lower than 1.7 bars, and more preferably ranging from 1.3 to 1.6 bars; this pressure is sufficient for overcoming the above commented pressure resistances, thus avoiding high pressures. Said low pressure blowers are usually selected from side channel blowers or roots blowers.

As a result of this system, the upgraded biogas exiting the bubble column has the following characteristics:
Methane >85%;
Carbon dioxide <5%,
Oxygen <0.1%;
Nitrogen <9%
Hydrogen sulphide <150 ppmv,
Saturated with water.

That is to say, the biogas is successfully cleaned and upgraded. Said upgraded biogas is also cleaned from hydrogen sulphide to a level which is ready for use, for instance as fuel for combined heat and power supplies (CHP) or boilers. This type of devices are commonly used in wastewater treatment plants for the heat and electricity consumption (for instance, for keeping the temperature in anaerobic digesters).

However, since the upgraded biogas still shows an important amount of hydrogen sulphide and/or an important amount of water that may determine its final use, it should be further cleaned in the event that it is intended as fuel for vehicles or for gas grid injection. Therefore, in a preferred embodiment the cleaning and upgrading system may further comprise means for further cleaning the upgraded biogas after exiting the bubble column and before transporting thereof to a storage tank. This is a final polishing step, as commonly described in prior art, the polishing means preferably including a cooling device for cooling down the upgraded biogas to about 5° C. (preferably between 4 and 6° C.), and adsorption filters with layers of a material that can be regenerated by i.e. heating or a decrease in pressure, said materials being selected from the group consisting of: silica gel, molecular sieves (zeolites) and/or activated carbon, or any combination thereof. As stated, the cleaning or polishing means can be included in the system whenever the upgraded biogas is still unsuitable for fuel vehicle use or gas grid injection, that is to say whenever the biogas still shows e.g. a total sulphur >20 mg/$Nm^3$ and water dew point higher than −10° C. at 200 bar, according to ISO 6327 and/or small amounts of siloxanes.

In a preferred case, the system further comprises an axial pump for recycling water from the small bubble retention area to the contact area, in order to improve the mass transfer efficiency. Water recycling by this pump produces an additional recycled liquid flow, $L_R$, resulting in a recycled liquid-to-gas flow ratio ($L_R$/G) that varies from higher than 0 to 15, and more preferably from 5 to 15 which increases water-gas contact inside the column. The axial pump comprises a suction pipe inlet located at a height from 100 to 500 mm below fine bubble diffusers, and an impulsion pipe outlet at a height from 500 to 1000 mm above fine bubble diffusers.

Preferably, the system comprises a wash water flow-meter acting by means of a Programmable Logic controller (PLC) over biogas blowers with variable speed drivers, to automatically control and maintain the $L_f$/G ratio. This way, when the wash water flow injected by gravity decreases or increases, the biogas flow automatically varies proportionally and the $L_f$/G value remains constant inside the bubble column. Preferably the flow-meter is of the open channel ultrasonic type.

For wash water it should be understood "primary treated wastewater". The primary treatment usually is a mechanical pre-treatment which includes screens for removal of debris and other disturbing solids, screening treatment and grit for removal of mineral solids (stones, grit and sand) as well as grease traps for removal of fat, oil and grease, and, in some plants, a primary clarifier for suspended solids removal, sometimes enhanced by chemical addition, having a typical composition of COD (chemical oxygen demand) from 100 to 1000 mg/l, TSS (total suspended solids) from 50 to 500 mg/l, pH from 6.5 to 8 and temperature from 5° C. and 30° C. This way, the wash water is a flow of primary treated wastewater (i.e. partially or pretreated water) wherein a percentage of solids, grit, fat and grease are removed previously to conveying thereof inside the bubble column. Primary treated wastewater is a "free" water source available in wastewater treatment plants, with the added benefit of a low oxygen concentration, unlike wash water used in prior art (regenerated water by stripping or treated wastewater) which causes the presence of this contaminant in the upgraded biogas. The well-known water scrubbing systems use the treated flow of effluent water produced in the WWTP, after complete biological treatment and removing all impurities.

According to the above, the disclosed bubble column is designed in such a way that the pre-treated effluent can be used as wash water in biogas upgrading processes, unlike packing scrubber systems in the prior art that require treatment plant effluent to avoid clogging problems.

It should be taken into account that the disclosed system uses a high amount of primary wastewater that is further polluted due to the physical absorption process. The wash water used which comes out of the bubble column after the physical absorption process may contain dissolved $H_2S$, $CO_2$ and small amounts of methane, which represent a potential problem of odors and methane slip to the atmosphere. That is the reason why the system also provides wash water regeneration means as part of the whole system. The wash water regeneration means are specifically the biological reactor for secondary wastewater treatment comprised in the wastewater treatment facility, in such a way that the wash water outlet of the column is connected to a pipe that conveyed the used wash water to the secondary treatment facility of the plant, thus continuing the common line water of the wastewater treatment. This way, it can be understood that the disclosed cleaning and upgrading system of biogas is specifically connected to the WWTP between the primary and secondary treatment facilities. This feature further improves the advantages of the whole system, because the energy and structural costs are totally reduced: in this case the upgrading system comprises regeneration means for the primary treated wastewater used in the physical absorption, since said regeneration means are in this case the biological reactor of the plant itself used for the secondary treatment, that is connected to the wash water outlet of the third exit area of the column. This way, the water regeneration is provided by the already existing biological process placed below the invention (activated sludge in most cases). The used wash water exits the column and enters the biological reactor (secondary treatment) by gravity, wherein bacteria oxidize hydrogen sulphide to sulphate and methane to carbon dioxide and water, at very low energy consumption. By this means, the system minimizes methane slip to the atmosphere to less than 1% and the problems of hydrogen sulphide odors, while avoiding water consumption in the system.

In an even more preferred case, the second influent pipe line or channel is a pipe that conveys the biogas produced in an anaerobic digester of the WWTP plant into the bubble column. In this embodiment, the existing WWTP is the source of both wash water and biogas to be upgraded, without the need of external supply of biogas.

As derived from these embodiments, a second object of the present invention is a wastewater treatment plant (WWTP) comprising a primary water treatment facility, a biological reactor as secondary treatment facility and a anaerobic digester for solids treatment, that further comprises the cleaning and upgrading system of biogas (preferably to biomethane) previously disclosed located between the primary and secondary treatment facilities, wherein the first influent pipe line of the system is connected to the primary treated wastewater flow outlet of the primary treatment facility, and the wash water outlet of the bubble column is connected to a pipe that conveyed the used wash water to the secondary treatment facility of the plant to which the wash water used for the biogas upgrading is conveyed for regeneration.

In a preferred embodiment the biogas to be upgraded is the biogas produced in the anaerobic digester of the plant itself, in such a way that the second influent pipe line conveyed the biogas from the anaerobic digester to the bubble column of the system. To sum up, in this object of the invention the disclosed upgrading system of biogas is introduced in the water line of an existing wastewater treatment plant without the need of significant changes in the structure or configuration, being specifically coupled between two facilities of the plant: the primary and the secondary treatment facilities. This way, the wastewater used as wash water in the column is also regenerated without the need of further means, since said flow of water is regenerated in the biological reactor of the secondary treatment, that is the natural water line of the plant.

In a preferred case, the wastewater treatment plant may comprise more than one cleaning and upgrading system as the one disclosed above between the primary treatment facility and the secondary treatment facility of the plant.

Thanks to this configuration of the improved plant, the system allows a parallel arrangement of the bubble columns, which share the same first and second influent pipe lines and have floodgates. This way, one of the columns may be isolated for maintenance works whereas the rest of the columns still continue operating.

Another object of the present disclosure is a method for cleaning and upgrading (raw) biogas, from any industrial source but preferably produced in wastewater treatment plants (WWTPs), for any use where only hydrogen sulphide removal is necessary (for example for feeding a combined heat and power (CHP) plant or boilers), and preferably to obtain biomethane as vehicle fuel or gas grid injection by using the system disclosed above wherein a further cleaning and upgrading is required, the method comprising:

a) injecting a flow of wash water, that is primary treated wastewater coming from the wastewater primary treatment facility of the WWTP, by gravity through the first inlet pipe line at a downward rate V ranging from 0.01 and 0.05 m/s to the first contact area of the non-pressurized bubble column comprised in the system;

b) injecting a flow of raw biogas into the bottom of the first contact area of the column through the second inlet pipe line in counter current conditions by means of the one or more fine bubble diffusers located at a height from 1.5 to 3 m below the first influent pipe line level and being connected to the one or more low pressure blowers at a pressure sufficient for overcoming: the pressure drop of diffusers, the water level above diffusers and the small pressure of 20-50 mbars above the water level required for upgrading biogas downstream processes, said pressure being preferably equal or lower than 1.7 bars, and more preferably ranging from 1.3 to 1.6 bars;

c) bringing the flows into contact for producing a physical absorption inside the first area of the bubble column, at the primary treated wastewater temperature (with a wide range of operation that preferably ranges from 5° C. to 30° C.) and at a high influent liquid-to-gas ratio $L_l/G$ (higher than 1, but preferably equal or higher than 3, more preferably from 3 to 10, and even more preferably from 4 to 6) without an energy input (the hydraulic retention time ranging from 30 to 320 seconds);

d) retaining fine bubbles in the second area of the column after the physical absorption step, and finally extracting the used primary treated wastewater from the column upwards through the third exit area;

e) collecting the biogas upgraded by physical absorption at the retention area located at the top of the column, above the first area thereof and the first influent pipe level; and f) regenerating the wash water used in the upgrading process inside the column, said used wash water coming out of the bubble column after the absorption process and being conveyed to the regenerating means that is the biological reactor of the wastewater treatment facility itself used for a secondary treatment.

Basically, simultaneous carbon dioxide and hydrogen sulphide removal from biogas is achieved in the physical absorption step, without the need of sulphide pre-cleaning and with no limitation regarding the hydrogen sulphide concentration in the raw biogas, unlike the prior art in which a hydrogen sulphide pre-cleaning <500 mg/m3 is needed to avoid corrosion and clogging of packing problems. Besides, very low energy consumption is achieved, equal or lower than 0.05 kWh/m³, since no pressure is needed to carry out the physical absorption step, the wash water flow is injected by gravity, without any pumping requirement even with large water flows, even of 10,000 m³/day. In fact, the flow of wash water may vary from small flows of 1 m³/h to even 10,000 m³/day, without pumping requirements.

For regenerating the wash water used in the absorption process, said wash water comes out of the bubble column after the absorption process and is conveyed to the regenerating means for removing the dissolved $H_2S$, $CO_2$ and small amounts of methane contained in the wash water, which represent a potential problem of odors and methane slip to the atmosphere. The regeneration step may preferably be a biological regeneration step.

The method may additionally comprise the step of periodically draining the solids from the wash water collected in the fourth settling area at the bottom of the column.

The method may comprise the additional step of recycling water from the small bubble retention area to the contact area at a recycled liquid $L_R$, by means of the axial pump described above, resulting in a recycled liquid-to-gas flow ratio ($L_R/G$) that varies from higher than 0 to 15, and more preferably from 5 to 15 for increasing the water-gas contact. The axial pump, as defined above, comprises a suction pipe inlet located at a height 100-500 mm below the fine bubble diffusers, and an impulsion pipe outlet at a height from 500 to 1000 mm above the fine bubble diffusers.

Since the upgraded biogas still shows a certain amount of hydrogen sulphide and/or a certain amount of water that may determine its final use, the method may further comprise a final cleaning/polishing step of the upgraded biogas after leaving the column, in the event that it is intended as fuel for vehicles or for gas grid injection. The method may further comprise a polishing step, in which the biogas upgraded by physical absorption comes out of the column upwards through the top thereof and is conveyed to cooling means for cooling down the temperature to about 5° C. (4° C.-6° C.), and subsequently to filtering means that comprises adsorption filters with layers selected from the group consisting of silica gel, molecular sieves, such as zeolites, activated carbon and any combination thereof, before conveying the upgraded biogas to the storage tank. Said filtering materials can be regenerated as well, therefore, the method may further comprise a heating step or a decrease in pressure step for regenerating the filtering means. Therefore, this preferred embodiment comprises:

cooling down the upgraded biogas to about 5° C. (preferably between 4° C. and 6° C.), and filtering with adsorption filters comprising layers of a material that can be regenerated by i.e. heating or a decrease in pressure, said materials being selected from the group consisting of: silica gel, molecular sieves (zeolites) and/or activated carbon, or any combination thereof.

The method not only comprises cleaning and upgrading the biogas, but also regenerating the primary treated wastewater used for upgrading the biogas, that shows a higher pollution due to the cleaning and upgrading process after the physical absorption. Said regenerating step is then a biological regeneration step, since the cleaning and upgrading system of biogas is specifically connected to the WWTP between the primary and secondary treatment facilities and the wastewater leaving the column after the physical absorption is conveyed to the biological reactor of the plant. The step of regenerating the primary treated wastewater used in the physical absorption in the plant itself preferably consists in:

extracting said wastewater from the column after the physical absorption, and conveying it by gravity to the inlet of the biological reactor of the plant itself used for the secondary treatment, that is connected to the wash water outlet of the third exit area of the column.

This way, the water regeneration is provided by the already existing biological process that acts as secondary water treatment in the plant, wherein bacteria oxidize hydrogen sulphide to sulphate and methane to carbon dioxide and water, at very low energy consumption, and thus continuing the common line water of the wastewater treatment. By this means, the system minimizes methane slip to the atmosphere to less than 1% and the problems of hydrogen sulphide odors, while avoiding water consumption in the system.

Besides, in a preferred embodiment, the flow of biogas is injected from the anaerobic digester of the existing wastewater treatment plant through the second pipe line that connects both the anaerobic digester and the bubble column of the system, without the need of external supply of biogas. According to this statement, a further, most preferred embodiment of the cleaning and upgrading method comprises:

a) injecting the flow of primary treated wastewater coming from the wastewater primary treatment facility of the WWTP, by gravity through the first inlet pipe line at a downward rate V ranging from 0.01 and 0.05 m/s to the first contact area of the non-pressurized bubble column comprised in the system;

b) injecting the flow of raw biogas coming from the anaerobic digester of the plant into the bottom of the first contact area of the bubble column through the second inlet pipe line in counter current conditions by means of the one or more fine bubble diffusers located at a height from 1.5 to 3 m below the first influent pipe line level and being connected to the one or more low pressure blowers at a pressure sufficient for overcoming: the pressure drop of diffusers, the water level above diffusers and the small pressure of 20-50 mbars above the water level required for upgrading biogas downstream processes, said pressure being preferably equal or lower than 1.7 bars, and more preferably ranging from 1.3 to 1.6 bars;

c) bringing the flows into contact for producing a physical absorption inside the first area of the bubble column, at the primary treated wastewater temperature (that preferably ranges from 5° C. to 30° C.) and at a high liquid-to-gas ratio $L_l/G$ (higher than 1, but preferably equal or higher than 3, more preferably from 3 to 10, and even more preferably from 4 to 5) without an energy input (the hydraulic retention time ranging from 30 to 320 seconds);

d) retaining fine bubbles in the second area of the column after the physical absorption step, and extracting the used primary treated wastewater from the column upwards through the third exit area and conveying it to the biological reactor of the secondary treatment of the plant through the pipe that connects the first and the secondary treatment facilities, for regenerating thereof;

e) collecting the biogas upgraded by physical absorption at the retention area located at the top of the column, above the first area thereof and the first influent pipe level; and f) extracting the used wastewater from the column after the physical absorption, and conveying it by gravity to the inlet of the biological reactor of the plant itself used for the secondary treatment, that is connected to the wash water outlet of the third exit area of the column.

This preferred method may also comprise the step of recycling water from the small bubble retention area to the contact area by means of the axial pump at a recycled liquid-to-gas flow ratio (named "$L_R/G$") from higher than 0 to 15 and more preferably from 5 to 15 for increasing the water-gas contact. The axial pump comprises a suction pipe inlet located at a height 100-500 mm below the fine bubble diffusers, and an impulsion pipe outlet at a height from 500 to 1000 mm above the fine bubble diffusers.

Preferably, the method according to any of the alternatives commented in this section further comprises automatically controlling and maintaining constant the $L_f/G$ ratio of the physical absorption inside the column by means of a wastewater flow-meter acting by means of a PLC over biogas blowers.

To sum up, the advantages of the present invention, both system and method, are the following:
- Easy to install in existing WWTPs, taking advantage of available wastewater with the $L_f/G$ ratio as required in this invention and biological treatment for water regeneration.
- A (very low) energy consumption equal or lower than 0.05 kWh/Nm$^3$, since it is a non-pressurized system, the water absorption occurs by gravity, no water cooling requirements are used, no heat demand is needed for regeneration and low pressure biogas blowers are used.
- No hydrogen sulphide pre-cleaning is required since mechanical equipment with corrosion problems is avoided and simultaneous H$_2$S and CO$_2$ removal is carried out in the absorption column.
- Oxygen pollution in upgraded biogas is minimized since primary treated wastewater has not dissolved oxygen and thus there is no stripping of that gas during absorption.
- The system minimizes problems of hydrogen sulphide odor by treating wash water in the biological reactor of the plant itself, that is to say without additional means.
- The system minimizes the methane slip to the atmosphere by treating the wash water in the biological reactor of the plant itself.
- No water consumption is needed, because the system is inserted in a wastewater treatment plant, using primary treated wastewater, and it is further regenerated with the biological reactor in the WWTP.
- No consumables demand: No antifouling agent is required since packing is not used for absorption.
- No clogging by bacterial growth and elemental sulphur precipitation since no packing is used.
- No heat requirement for regeneration since it is just a physical absorption process (by gravity).
- Low capital cost even for small flows down to 1 m$^3$/h to large flows up to 2,000 m$^3$/H, by a quite simple system and process with very little equipment (low pressure blowers, fine bubble diffusers and final drying step), which makes the system feasible for small scale installations (<100 Nm$^3$/h biogas).

TABLE 2

Comparison of upgrading technologies in the prior art and the present invention. The main characteristics

|  | PSA | Water scrubbing with regeneration | Water scrubbing without regeneration | Organic Physical Scrubbing | Chemical scrubbing | Present invention |
|---|---|---|---|---|---|---|
| Upgrading system | Adsorption material (zeolites, activated carbon) at elevated pressure | Packing scrubber counter flow of water Flash tank, desorption column, cooling and water recycling | Packing scrubber counter-current Flash tank | Packing scrubber counter-current w/n polyethylene glycol Regeneration column | Packing chemical scrubber counter-current With amine Regeneration column | Counter-current Bubble column absorption by gravity and water regeneration in biological reactor |
| Liquid/Gas (m$^3$ at 20° C./Nm$^3$ gas) | No liquid | 0.1-0.3 | 0.1-0.3 | <0.1 | <0.1 | 3-10 High water flow non pressurized |
| Working pressure (bar) | 47 | 6-10 | 6-10 | 4-7 | 0 | 1.3-1.6 |
| High pressure compressors | Yes. Also Vacuum compressors with VPSA | Yes | Yes | Yes | No | No. Low pressure biogas blowers for fine-bubble diffuser injection |
| Water pumps | NO | Yes | Yes | Yes | Yes | No, by gravity |
| Methane loss | <10% | 1-5% | 1-5% | 2-10% | <0.1% | <6% |
| Methane content in upgraded gas | >96% | 71-98 | 71-98 | >96% | >99% | 85-94% |

TABLE 3

Comparison of upgrading technologies in the prior art and the present invention. The main drawbacks

| Drawbacks | PSA | Water scrubbing with regeneration | Water scrubbing without regeneration | Organic Physical Scrubbing | Chemical scrubbing | Present invention |
|---|---|---|---|---|---|---|
| Electricity consumption (kWh/Nm3) | 0.25-0.5 | 0.3-0.6 | 0.3-0.6 | 0.24-0.33 | <0.15 | <0.05 |
| Pre-cleaning needed for $H_2S$ > 500 mg/m3 | Yes: wWater and H2S removal before vessels | Yes: to avoid corrosion and media blockage | Yes: to avoid corrosion | Yes: to avoid high temperatures for regeneration | Yes: to avoid high temperatures for regeneration | No. Simultaneous $CO_2$ and $H_2S$ removal |
| Simultaneous $CO_2$ and $H_2S$ removal | No | Yes, for $H_2S$ < 500 mg/m³ | Yes, for $H_2S$ < 500 mg/m³ | Yes, for $H_2S$ < 500 mg/m³ | Yes, for $H_2S$ < 500 mg/m³ | Yes. Up to 20,000 ppmv of $H_2S$ |
| Biomethane pollutants | — | Biomethane with $O_2$ and $N_2$ from stripping | Biomethane with $O_2$ and $N_2$ from treated wastewater | Biomethane with $O_2$ and $N_2$ from stripping | — | No oxygen. $N_2$ from wash water |
| $H_2S$ Odour problems | NO, if pre-cleaned | Off-gas with $H_2S$ requires post-treatment | Final water with dissolved $H_2S$ | NO, If prior $H_2S$ cleaned | NO, if prior cleaning | NO. Wash water treated in wastewater reactor |
| Methane slip treatment | Off gas leaving PSA column. 3% | Off-gas leaving stripping vessel 1-2% Off gas treatment needed | No solution Water leaving fash tank to discharge 1-2% | Off-gas leaving stripping vessel 2-4% Off gas treatment needed | No required | Biological treatment |
| Water consumption | NO | <0.05 m³ water/Nm³ | 0.1-0.3 m³ treated wastewater/Nm³ | NO | NO | NO 4-6 m³ primary wastewater/Nm³ Regenerated in VWVTP |
| Cooling requirements | Biogas cooling after before PSA column | Water cooling before recycling to less than 7° C. | Biogas before absorption column | Gas and water cooing | Liquid recirculation and CO stripping | Biogas drying as final polishing step |
| Heat demand for regeneration (° C.) | NO | NO | NO | 55-80° C. | 160° C. | NO |
| Consumibles demand | Activated carbon, zeolites | Antifouling agent, drying agent | Antifouling agent, drying agent | Organic solvent (no hazardous) | Amine solution (harzardous, corrosive) | drying agent |
| Clogging/mechcanical problems | Valves problems | Clogging in packing. Growth of bacteria. Elemental Sulfur in air desorption column | Clogging In packing Growth of bacteria | Clogging in packing Mechanical equipment | Clogging in packing Mechanical equipment | NO |
| Design complexity and capital costs | 6-9 vessels in parallel. Multiple valves and pumps | Pumps, high pressure compressors, multiple valves and tanks | Pumps, high pressure compressors, multiple valves and tanks | Pumps, high pressure compressors, multiple valves and tanks | Pumps, high pressure compressors, multiple valves and tanks | Simple design in one single tank without pumping |
| Size | Not economically feasible for raw biogas flow < 60-70 Nm³/h Small to medium capacity | Medium to large size Not economically feasible for raw biogas flow < 60-70 Nm³/h | Not economically feasible for raw biogas flow < 60-70 Nm³/h | Not economically feasible for raw biogas flow < 150 Nm³/h | Medium to large Not economically feasible for raw biogas flow < 250 Nm³/h | Economically feasible for raw biogas flow from 1 to 2500 Nm3/h |

DETAILED DESCRIPTION OF THE INVENTION

Figure 1:
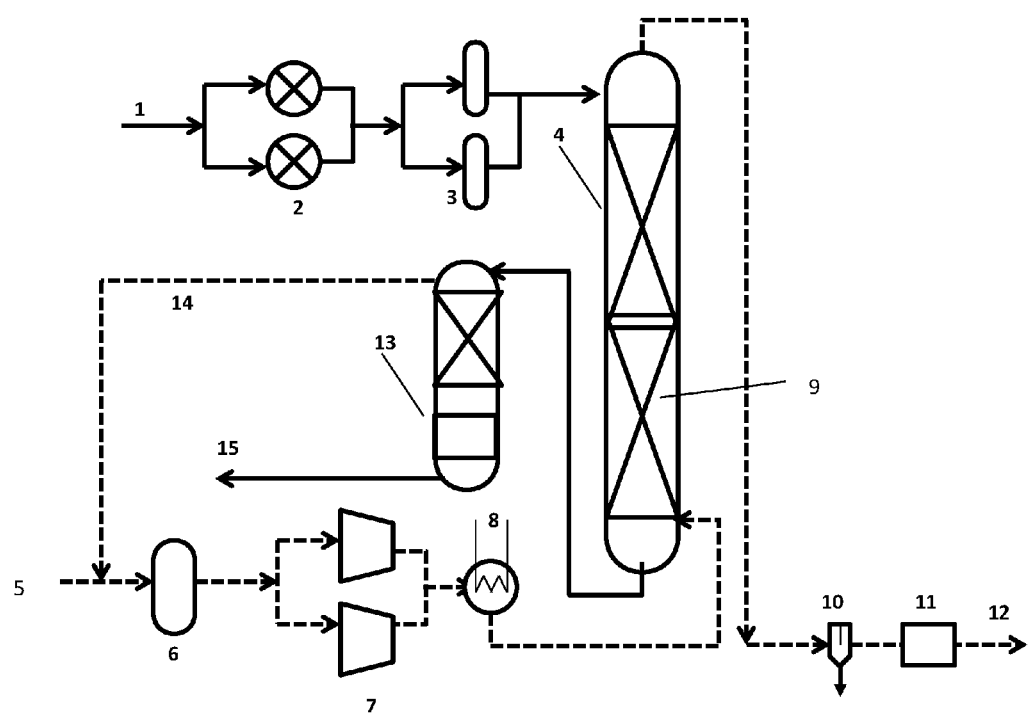
FIG. 1 (Prior art) illustrates a well-known schematic representation of biogas upgrading by water scrubbing system without regeneration.
1. First inlet pipe for wash water
2. High pressure water pumps
3. Solids removal filters
4. Absorption column
5. Second inlet pipe for raw biogas flow to upgrade
6. Hydrogen sulphide and moisture separator
7. High pressure compressor
8. Gas cooler
9. Packing Separator
10. Condensate separator
11. Gas drying and purification device
12. Biogas upgraded to vehicle fuel quality flow
13. Flashing vessel
14. Gas recirculation flow/pipe
15. Wash water effluent flow/pipe FIG. 2 (present invention) illustrates a schematic representation of the overall upgrading and cleaning system, inserted in a wastewater treatment plant having an biological reactor, according to a particular embodiment of the present invention.
16. Biogas cleaning and upgrading system
17. Anaerobic digester
18. Biomethane final polishing means
19. First inlet pipe for primary treated wastewater pipe
20. Primary treatment facility of the plant
21. Non-pressurized bubble column
22. Flow-meter
23. biological reactor for the secondary treatment of the plant
24. PLC
25. Biogas blower
26. Fine bubble diffusers
27. Cleaned and upgraded biogas flow/pipe
28. Gas Cooling means
29. Wash water flow after being used inside the column 21
30. Outflow of the biological reactor 23 of the plant

FIG. 1 illustrates the prior art, and shows a conventional, well-known wash water system for upgrading biogas, without water regeneration of the used wash water.

The raw biogas to be upgraded is conveyed by a second inlet pipe (5) inside an absorption column (4) wherein it is brought into contact with the water influent/wash water conveyed to the said column (4) through a first inlet pipe (1) at a high pressure; components of the biogas, mainly $CO_2$, are absorbed by the water until the saturation equilibrium is reached.

The wash water is pressurized by high pressure water pumps (2) to 7-14 bars and, afterwards solids removal filters (3) are fed on the top of the absorption column (4), before the inlet of the wash water.

The raw biogas is just above atmospheric pressure and water saturated. An hydrogen sulphide removal step is necessary when hydrogen sulphide concentration is higher than 500 mg/m$^3$, being carried out with a hydrogen sulphide and moisture separator (6). Moisture and particulates must also be removed before the gas is compressed in a high pressure compressor (7) up to 7-14 bars. The intake biogas temperature can vary from 15 to 38° C. (preferably 30° C.) and an outlet temperature after compression can be 70° C. for a discharge of 9 bar and it is cooled by cooling means or gas cooler (8) before absorption. Both flows, liquid and biogas are forced to enter the vessel of the column (4) in counter-current conditions by injecting the gas at the bottom and the water from the top in opposite directions. The absorption column (4) is provided with random packing separator (9) in order to obtain a maximum mass transfer. In this column (4), carbon dioxide is absorbed by the water, and the biogas which exits the column (4) is enriched on methane. The gas leaving the absorption column (4) has a methane concentration from 70 to 98% by volume. To obtain biogas upgraded to vehicle fuel quality, it passes to a final polishing step with a condensate separator (10) and to a gas drying and purifying device (11) to remove water to control the dew point below −80° C. and small amounts of hydrogen sulphide. Finally, the flow of gas upgraded to vehicle fuel quality (12) is odorized in order to be able to detect gas leakages should they occur.

Since methane is partly water soluble, the water from the absorption vessel is, in order to lower the methane losses, conveyed to a flashing vessel (13). In the flashing vessel the water is de-pressurized down to 2 bars and the dissolved gas comes out. The dissolved gas, which contains some methane but mainly carbon dioxide, is recirculated through a gas recirculation pipe (14) and transferred back to the second inlet pipe for raw biogas (5). Wash water effluent is withdrawn through a pipe (15) from the flashing vessel (13) without regeneration.

Methane which is dissolved in the wash water effluent and not separated in the flash vessel (13) leaves the plant, thus methane slip and odors of sulphide can be a problem in the final discharge of water. Clogging or biological growth in packing separators (9) in the absorption column is another existing problem in plants without regeneration of water, when using treated sewage water. In those cases there are some biological materials that get stuck in the packing separator (9) or cause growth.

Figure 2:
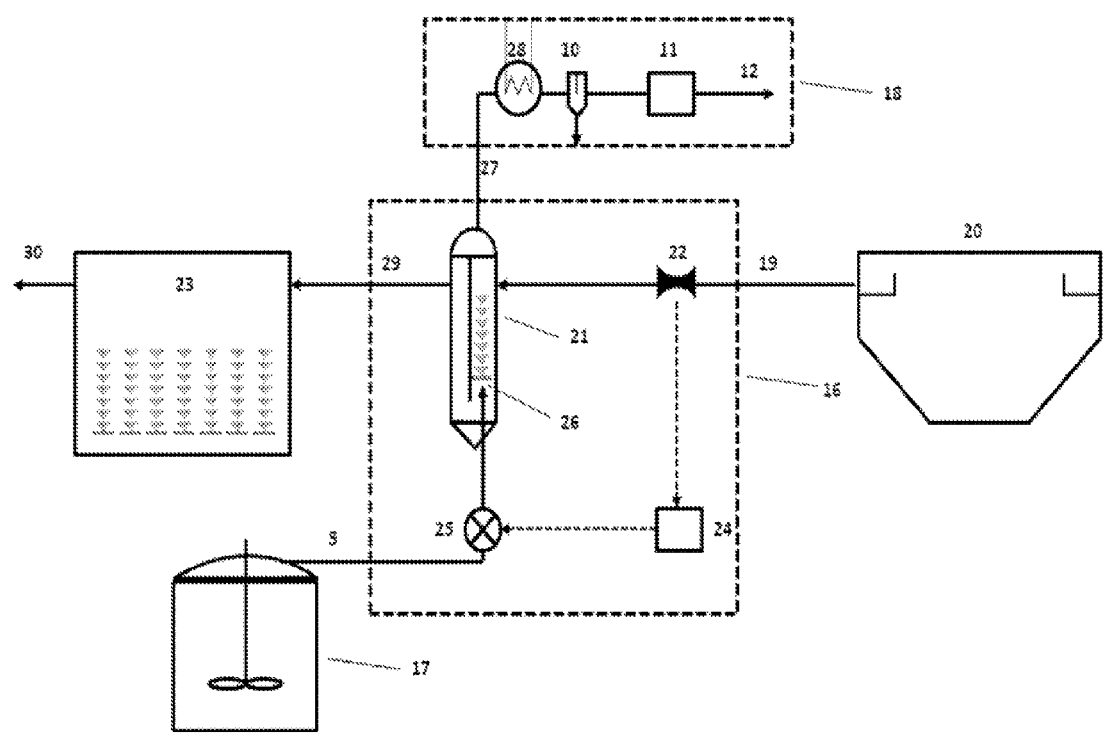

On the contrary, FIG. 2 illustrates a general description of a system according to the present invention for cleaning and upgrading biogas. A complete system for cleaning and upgrading biogas (16) including a final polishing step with biomethane final polishing means (18) is installed in a wastewater treatment plant for upgrading the raw biogas generated in an anaerobic digester (17) of the biosolids produced in the plant.

The system (16) makes it possible to carry out a physical water absorption and regeneration process with primary treated wastewater as the wash water used. Primary treated wastewater comes by a first inlet pipe or channel (19) from a primary treatment facility of the plant (20), which usually consists of screening solids, oil and sand removal and a primary clarification to remove suspended solids.

High efficiency absorption is achieved in a non-pressurized bubble column (21) with a high influent liquid-to-gas flow ratio $L_f/G$ from 4 to 6 inserted in the pipe line or channel (19) that usually comes by gravity from primary wastewater treatment to biological reactor (23) for the secondary treatment of the plant. Large water flows can be used as high as 10,000 m3/day, without any pumping requirements. Besides, there is no water consumption because water is further regenerated in the biological reactor (23).

The $L_f/G$ ratio is automatically controlled and maintained by a wastewater flow-meter (22) acting by means of a PLC (24) over the biogas blowers (25) with variable speed (rate) drivers. When the wastewater flow decreases or increases, the biogas flow automatically varies proportionally and the $L_f/G$ value remains constant.

Raw biogas coming from anaerobic digestor (17) of the wastewater treatment plant is injected through the inlet pipe (19) at the bottom of the bubble column (21) by means of fine bubble diffusers (26).

Cleaned and upgraded biogas flow (27) is collected at the top of the bubble column (21). It may be enriched but still unsuitable for use as vehicle fuel. In this case, to obtain vehicle fuel quality a final polishing step is necessary, by cooling down to about 5° C. by means of cooling means (28). A condensate separator (10) and a drying and purifying device (11), which is an adsorption filter with various layers of silica gel, molecular sieves (zeolites) and/or activated carbon are also necessary for final drying and purification of small amounts of pollutants, mainly hydrogen sulphide and siloxanes. These materials are usually regenerated by i.e. heating or decreasing the pressure (not shown in the diagram). Finally, an biogas upgraded to vehicle fuel quality flow (12) is obtained Besides, cooling water means are not required because absorption is carried out at primary treated wastewater temperature and there is no heating energy input in the process, i.e. no high pressure compressors, pressurized water feeding nor recycling pumping as in the prior art.

Wash water/wastewater flow (29) which comes out of the bubble column (21), contains dissolved $H_2S$, $CO_2$ and small amounts of methane, which represents a potential problem of odors and methane slip to the atmosphere. The present invention also provides simple wash water regeneration means by the biological reactor (23) of the wastewater treatment plant itself. The wash water enters the biological reactor (23) by gravity where bacteria oxidize hydrogen sulphide to sulphate and methane to carbon dioxide and water, at a very low energy consumption. The outflow of the biological reactor (30) is, therefore, free from biogas pollution. By this method, the system minimizes methane slip to the atmosphere and problems of hydrogen sulphide odors.

Figure 3:
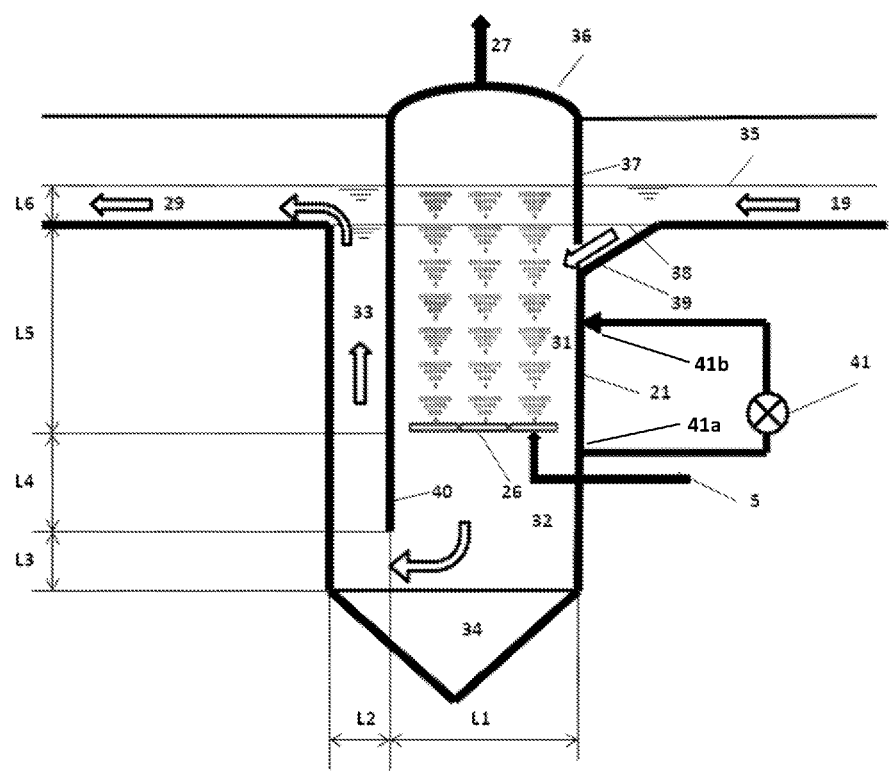
FIG. 3 illustrates a schematic representation of the bubble column according to a particular embodiment of the present invention.
31. (First) Contact area
32. (Second) Small bubble retention area
33. (Third) Exit area
34. (Four) Settling area
35. Maximum water level
36. Biogas hopper
37. Vertical baffle for separating the contact area and the exit area
38. Influent pipe bottom
39. Influent baffle
40. Vertical baffle
41. Recycling axial pump, having a suction pipe inlet (41a) and an impulsion pipe outlet (41b) that connects the (second) small bubble retention area with the (first) contact area of the bubble column (21)

The present invention also provides a novel design of the non-pressurized bubble column (21), as shown in FIG. 3, which comprises four areas. The water enters downwards a first contact area (31) through the first inlet pipe (19) by gravity from the top, while the biogas flow is injected through the second inlet pipe (5) in counter-current at a distance $L5=1.5$ to 3 m below first inlet pipe (19) level by means of low pressure blowers (25) from 1.3 to 1.6 bars and fine bubble diffusers (26), such pressure only required to overcome the pressure drop of diffusers to maintain the water level above diffusers and a small pressure of 20-50 mbars above the water level being required for upgrading biogas downstream processes. The first contact area has a surface $S=L1 \times L1$, where L1 is the width/length of contact area. L1 is calculated from a specific water flow to obtain a downwards water rate V from 0.01 m/s and 0.05 m/s.

A second small bubble retention area (32) with the same downwards rate as the first area, with a height $L4=1$-$1.5$ m, a height that is relevant to avoid small bubbles leaving with outlet water.

A third exit area (33) wherein water goes upwards and is separated from the first (31) and the second area (32) by a vertical baffle (40). This baffle (40) has an opening at the bottom with a height L3 having the same dimension as L2, which is the width of exit area (33). L2 is calculated to obtain upflow velocity of 0.3 to 0.6 m/s.

A fourth settling area (34) is located at the bottom of the bubble column (21), wherein solids from primary treated wastewater are collected and drained periodically. Upgraded biogas flow (27) is collected at the top of the column by means of a biogas hopper (36) with a vertical baffle (37), that is located above the maximum water level (35) inside the column (21), its lowest end being 10-20 cm below the influent pipe bottom (38) to prevent biogas from escaping to the atmosphere when no influent is entering. Another influent baffle (39) permits the inflow of influent in the first contact area (31) at the same time that it prevents fine bubbles from escaping to the atmosphere.

To improve mass transfer efficiency, water is recycled from the small bubble retention area (32) to the contact area (31) by means of an axial pump (41). The suction pipe inlet (41a) of said axial pump is located at a height from 100-500 mm below fine bubble diffusers (26), and the impulsion pipe outlet (41b) of said axial pump is located at a height from 500 to 1000 mm above the fine bubble diffusers (26).

EXAMPLES

Example 1. Experimental Study: Small Pilot Plant for Upgrading Biogas: Biogas Flow=0.45 to 2.4 m$^3$/h With a specific design, the stoichiometric water flow for obtaining a saturation concentration of $CO_2$ in water ($L_{min}$), which is the minimum water flow required to dissolve the carbon dioxide, will be determined by the concentration of carbon dioxide in the biogas, the pressure and temperature of the process and the solubility of the carbon dioxide in water, considering the less favorable conditions (Southern Spain, summer, max. temperature in wastewater).

$$\frac{L_{min}(l/h)}{G(l/h)} = \frac{Q_{CO_2}(\text{gas})\frac{\text{mol}}{1}}{Q_{CO_2}(\text{water})(M)}$$

where G is the biogas flow (l/h).

$$Q_{CO_2}(\text{biogas})\frac{\text{mol}}{1}$$

is the molar concentration of $CO_2$ in biogas:

$$Q_{CO_2}(\text{biogas})\frac{\text{mol}}{1} = \frac{n \text{ moles}}{V} = \frac{P_{CO_2}}{R \times T}$$

Considering a maximum temperature of the process (summer conditions) of T=25° C., $P_{abs}$=1 atm and 43% of $CO_2$ in biogas.

$$Q_{CO2}(\text{biogas}) = 0.014 \cdot \frac{\text{mol}}{l}$$

$Q_{CO_2}$ (water)(M) is the saturation concentration of $CO_2$ in water:

$$Q_{CO_2}(\text{water})\frac{\text{moles}}{l} = X_{sat}\frac{\text{moles CO}_2}{\text{moles water}} \times 56\frac{\text{moles water}}{l \text{ water}}$$

where $X_{sat}$ is the equilibrium mole fraction of $CO_2$ in water, from Henry's law, $P_{abs}$=1 atm, and T=25° C.:

$$X_{sat} = \frac{P_{CO_2}(\text{atm})}{k_{H,px}(\text{atm})} = \frac{0.35}{1630} = 0.000215\frac{\text{moles CO}_2}{\text{moles water}}$$

and $$Q_{CO_2}(\text{water}) = 0.012\frac{\text{moles}}{l}$$

then $$\frac{L_{min}(l/h)}{G(l/h)} = \frac{0.014}{0.012} = 1.19$$

This last value is the minimum L/G ratio that must be used in order to avoid saturation of $CO_2$ in the water. However, considerable higher values are herein considered in order to maximize the performance of the system by increasing the mass transfer driving force in the water column ($C_{sat}$–C).

A pilot unit with the following design parameters and efficiency were tested:

Biogas
  Flow: 0.43 to 1.2 m³/h
  Methane: 55%
  Carbon dioxide: 43%
  Hydrogen sulphide: 20,000 ppmv
Wastewater:
  Temperature: 17° C.
  Wastewater flow: 2.9 m³/h
  $L_l$/G=2.3 to 6.2
Absorption Column
  Distance from diffusers to influent pipe level (L5) 1.5-2 m
  Fine bubble diffuser diameter: 270 mm
  Number of diffusers: 1
  Column inlet diameter: 292 mm
  Column area: 0.07 m²
  Downward water velocity (rate): 0.041 m/s
  Distance from diffusers to column outlet (L4) 1 to 1.5 m
Process Efficiency
  Methane losses: <7%
Biomethane Composition
  Methane: >85%
  Carbon dioxide 4-8%
  Hydrogen sulphide 130-473 ppm
  Oxygen <0%
  Water saturated
Wash Water Composition
  Dissolved methane ≈14 mg/L
  Dissolved hydrogen sulphide 1-5 mg/L
  Dissolved carbon dioxide: 260-850 mg/L Using a different biogas with a composition closer to the produce in WWT facilities the following performance was found:

Biogas
  Flow: 0.43 to 1.4 m³/h
  Methane: 65%
  Carbon dioxide: 35%
Wastewater:
  Temperature: 17° C.
  Wastewater flow: 2.9 m³/h
  $L_l$/G=2 to 6
Absorption Column (Same Conditions as the Above Mentioned) Process Efficiency
  Methane losses: <7%
Biomethane Composition
  Methane: >86%
  Carbon dioxide 3.6-5%
  Water saturated
  Oxygen <0%
Wash Water Composition
  Dissolved methane <14 mg/L
  Dissolved carbon dioxide: 215-600 mg/L Example 2. Design of a Full-Scale Biogas Upgrading Plant According to the Present Invention Considering a wastewater treatment plant for domestic wastewaters with a daily influent flow of 60,000 m³ and a conventional technology based on activated sludge process where the sludge generated in the primary treatment (primary sludge) and a part the biosolids produced during the secondary treatment (secondary sludge) are fed to anaerobic digesters, together with other biodegradable substrates. Assuming average values of organic load and anaerobic digestion yield to methane, this facility can produce 7,000 to 11,000 m³ of raw biogas per day resulting in $L_l$/G ratios 5.4-8.5, which are between the ranges considered in the invention herein described. It must be stressed that the daily biogas production can be considerable lower in too many cases as: digestor overloading, bad digester performance or low organic loading rates. However, these ratios will allow to produce up-graded biogas with a quality sufficient for thermal and electric production if a CHP installation is installed. In other hand, if required the up-graded biogas can be derived to biomethane with potential use for vehicles or grid injection after a polishing step consisting in a cooling down process and filtering with specific absorbents for the sulfur compounds present in biogas. It must be considered that the operational costs of this step will be very small since most of the $H_2S$ (98%) will be removed inside the column.

The invention can be easily installed in the facilities using a sump configuration integrated into a pipe or conduction of the effluent settlers. Given that the mechanical requirements of the process are scarce and the operations depend mainly in the ratios of both phases, the invention it is presented as very adaptable installations.

In any of the cases described, CHP or biomethane production for external uses, the invention can provide a considerable monetary return due to the following facts:

A total flow of between 4200 to 6000 m³ per day of up-graded biogas or biomethane are produced with very small consumption of electricity, mainly involve in the pumping of the biogas (168-240 kWh per day);
  The use of chemicals in desulfuration is reduced or even skip out;
  The energy consumption is reduced compare to the cleaning and upgrading systems described in the prior art.

The invention claimed is:
1. A system for cleaning and upgrading biogas having hydrogen sulphide concentration up to 20,0000 ppmv by means of physical water absorption, connectable to a facility for primary wastewater treatment of an existing WWTP, characterized in that it comprises:
   a) a first influent pipe line or channel that provides wash water to the system by gravity and in the absence of pumping means, the wash water being primary treated wastewater coming from the wastewater primary treatment facility of the WWTP;
   b) a second influent pipe line or channel that provides the biogas to the system;
   c) a counter-current, non-pressurized physical absorption bubble column for achieving a simultaneous removal of hydrogen sulphide and carbon dioxide and having a high influent liquid-to-gas flow ratio $L_f/G$ higher than 1, the bubble column comprising four areas:
      a first contact area at the top of the column, wherein the wash water enters downwards through the first influent pipe line by gravity at a rate V ranging from 0.01 m/s and 0.05 m/s, and the biogas is injected through the second influent pipe line in counter-current conditions by means of one or more fine bubble diffusers located at a height from 1.5 to 3 m below the first influent pipe line level and being connected to one or more low pressure blowers at a pressure sufficient for overcoming: the pressure drop of diffusers, the water level above diffusers and the small pressure of 20-50 mbars above the water level required for upgrading biogas downstream processes;
      a second small bubbles retention area, located below and adjacent to the first area and having a height from 1 to 2 m to prevent small bubbles from leaving with the outlet water, and with the same downwards rate as the first area;
      a third exit area for water, located all along the column from the bottom to the top and adjacent to the first and second area, wherein the wash water goes upwards after the physical absorption at a rate of 0.3 to 1 m/s, having a vertical baffle to separate the used wash water flow from the first and the second areas, and a wash water outlet at the top thereof; and
      a fourth settling area for solids at the bottom of the bubble column below the second area, wherein solids from the wash water, if any, are collected and drained periodically;
      the bubble column also comprises an upgraded gas retention area at the top of the column, above the first area and the first influent pipe level, for collecting the upgraded biogas;
   and
   d) means for regenerating the used wash water connected to the wash water outlet of the third exit area of the column, said means being a biological reactor of the wastewater treatment facility itself used for a secondary treatment.
2. The cleaning and upgrading system of claim 1, wherein the influent $L_f/G$ ratio is comprised between 3 and 10.
3. The cleaning and upgrading system of claim 1, wherein the pressure at which the low pressure blowers blow the biogas is equal or lower than 1.7 bars.
4. The cleaning and upgrading system of claim 1, wherein the second small bubbles retention area has a height ranging from 1 to 1.5 m.
5. The cleaning and upgrading system of claim 1, wherein the system comprises a water recycling axial pump for taking water from the second small bubble retention area to the first contact area at a recycled liquid-to-gas flow ratio $L_R/G$ from higher than 0 to 15, having a suction pipe inlet located at a height 100-500 mm below the fine bubble diffusers, and an impulsion pipe outlet at a height from 500 to 1000 mm above the fine bubble diffusers.
6. The cleaning and upgrading system of claim 1, wherein the system comprises a wash water flow-meter acting by means of a Programmable Logic controller over the biogas blowers with variable speed drivers, for automatically controlling and maintaining the $L_f/G$ ratio.
7. The cleaning and upgrading system of claim 1, wherein the system comprises means for further cleaning the upgrading biogas after exiting the bubble column, the means including a cooling device for cooling down the upgraded biogas to 4° C.-6° C., and adsorption filters with layers of a material selected from the group consisting of: silica gel, molecular sieves, activated carbon, and any combination thereof.
8. A wastewater treatment plant (WWTP) comprising a primary treatment facility, a biological reactor as secondary treatment facility and an anaerobic digester for solids treatment, characterized in that it comprises the cleaning and upgrading system of biogas according to claim 1, the system being connected to the plant between the primary treatment facility, from which the wastewater is extracted and conveyed to the bubble column, and the biological reactor for the secondary treatment of the plant, to which the wastewater used as wash water for the biogas upgrading is conveyed, the biogas being the biogas produced in the anaerobic digester of the plant, and wherein:
   the first influent pipe line is a pipe coming from the wastewater primary treatment facility to the column,
   the second influent pipe line is a pipe that conveyed the biogas produced in the anaerobic digester of the plant into the bubble column;
   and the water outlet of the column is connected to the pipe that conveyed by gravity the primary treated wastewater used for upgrading the biogas to the biological reactor of the plant itself used for the secondary treatment, for regenerating said wastewater.
9. A method for cleaning and upgrading biogas by using the cleaning and upgrading system described in claim 1, wherein the method comprises:
   a) injecting a flow of wash water, that is primary treated wastewater coming from the influent of the WWTP, by gravity through the first inlet pipe line at a downward rate V ranging from 0.01 and 0.05 m/s to the first contact area of the non-pressurized bubble column comprised in the system;
   b) injecting a flow of biogas into the bottom of the first contact area of the column through the second inlet pipe line in counter current conditions by means of the one or more fine bubble diffusers located at a height from 1.5 to 3 m below the first influent pipe line level and being connected to the one or more low pressure blowers at a pressure sufficient for overcoming: the pressure drop of diffusers, the water level above diffusers and the small pressure of 20-50 mbars above the water level required for upgrading biogas downstream processes;
   c) bringing the flows into contact for producing a physical absorption inside the first area of the bubble column, at the primary treated wastewater temperature and at a high influent liquid-to-gas ratio $L_f/G$ higher than 1, without energy input;

d) retaining fine bubbles in the second area of the column after the physical absorption step, and finally extracting the used primary treated wastewater from the column upwards through the third exit area;

e) collecting the biogas upgraded by physical absorption at the retention area located at the top of the column, above the first area thereof and the first influent pipe level; and f) regenerating the wash water used in the upgrading process inside the column, said used wash water coming out of the bubble column after the absorption process and being conveyed to the regenerating means that is the biological reactor of the wastewater treatment facility itself used for the secondary treatment.

10. The method according to claim 9, wherein:

the $L_I/G$ ratio is comprised between 3 and 10;

the pressure at which the low pressure blowers injects the biogas inside the column is equal or lower than 1.7 bars; and the wash water goes upwards in the third exist area after the physical absorption at a rate ranging from 0.4 to 0.5 m/s.

11. The method according to claim 9, wherein the flow of biogas is injected from an anaerobic digester of the same wastewater treatment plant from which the primary treated wastewater is injected inside the column.

12. The method according to claim 9, wherein the method comprises the step of recycling water from the small bubble retention area to the contact area by means of a water recycling axial pump that connects both areas, at a recycled liquid-to-gas flow ratio $L_R/G$ from higher than 1 to 15.

13. The method according to claim 9, wherein the method comprises automatically controlling and maintaining constant the $L_I/G$ ratio of the physical absorption inside the column by means of a wash water flow-meter acting by means of a PLC over biogas blowers.

14. The method according to claim 9, wherein the method comprises a polishing step of the upgraded biogas after leaving the column, the method comprising:

cooling down the upgraded biogas to 4° C.-6° C., and filtering with adsorption filters comprising layers of a material selected from the group consisting of: silica gel, molecular sieves, activated carbon and any combination thereof.

15. The method according to the previous claim 14, wherein the biogas is upgraded to biomethane of vehicle fuel quality or to gas grid injection quality.

16. A method for cleaning and upgrading biogas by means of the wastewater treatment plant (WWTP) defined in claim 8, characterized in that the biogas to be upgraded is produced in the anaerobic digester of the plant and the primary treated wastewater comes from the plant itself, the method comprising:

a) injecting by gravity the flow of primary treated wastewater coming from the inlet facility of the WWTP, through the first inlet pipe line at a downward rate V ranging from 0.01 and 0.05 m/s to the first contact area of the non-pressurized bubble column comprised in the system;

b) injecting the flow of biogas coming from the anaerobic digester of the plant into the bottom of the first contact area of the bubble column through the second inlet pipe line in counter current conditions by means of the one or more fine bubble diffusers located at a height from 1.5 to 3 m below the first influent pipe line level and being connected to the one or more low pressure blowers at a pressure sufficient for overcoming: the pressure drop of diffusers, the water level above diffusers and the small pressure of 20-50 mbars above the water level required for upgrading biogas downstream processes;

c) bringing the flows into contact for producing a physical absorption inside the first area of the bubble column, at the primary treated wastewater temperature and at a high influent liquid-to-gas ratio $L_I/G$ higher than 1, without an energy input;

d) retaining fine bubbles in the second area of the column after the physical absorption step, and extracting the used primary treated wastewater from the column upwards through the third exit area and conveying it to the biological reactor of the secondary treatment of the plant through the pipe that connects the first and the secondary treatment facilities, for regenerating thereof;

e) collecting the biogas upgraded by physical absorption at the retention area located at the top of the column, above the first area thereof and the first influent pipe level; and f) extracting the used wastewater from the column after the physical absorption, and conveying it by gravity to the inlet of the biological reactor of the plant itself used for the secondary treatment, that is connected to the wash water outlet of the third exit area of the column.

17. The method according to previous claim 16, wherein the biogas is upgraded to biomethane of vehicle fuel or gas grid injection quality by means of a polishing step of the upgraded biogas after leaving the bubble column, the polishing step comprising:

cooling down the upgraded biogas to 4° C.-6° C., and filtering with adsorption filters comprising layers of a material selected from the group consisting of: silica gel, molecular sieves, activated carbon and any combination thereof.

* * * * *